W. BARTHOLOMEW AND F. BALZER.
CENTRIFUGAL EXTRACTOR MECHANISM.
APPLICATION FILED JUNE 25, 1917.
1,332,376.
Patented Mar. 2, 1920.
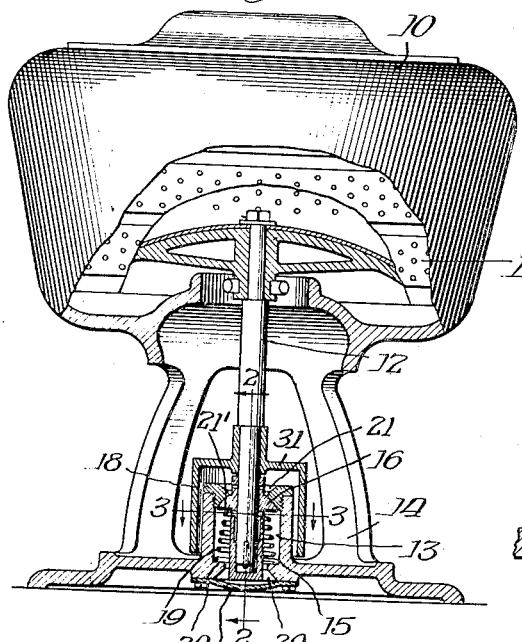
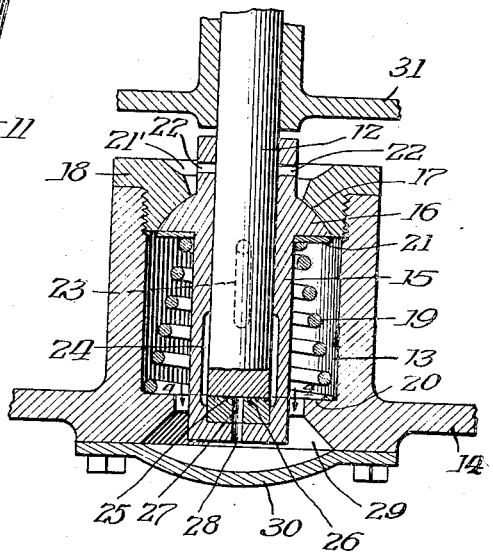
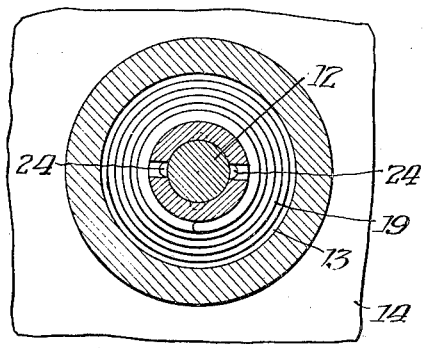
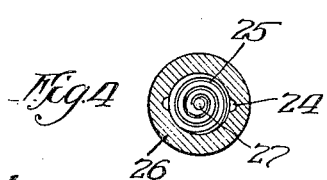
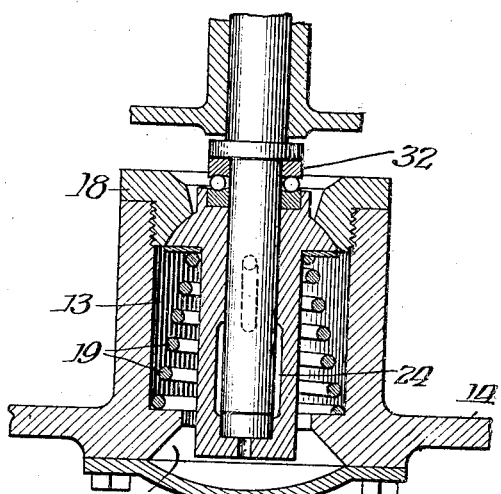
Witnesses:
Inventors
William Bartholomew
Fritz Balzer
By Wilkinson & Huxley
Attys

UNITED STATES PATENT OFFICE.

WILLIAM BARTHOLOMEW AND FRITZ BALZER, OF CHICAGO, ILLINOIS, ASSIGNORS TO TROY LAUNDRY MACHINERY CO., LTD., OF CHICAGO, ILLINOIS, A CORPORATION OF NEW YORK.

CENTRIFUGAL-EXTRACTOR MECHANISM.

1,332,376.      Specification of Letters Patent.      Patented Mar. 2, 1920.

Application filed June 25, 1917. Serial No. 176,773.

*To all whom it may concern:*

Be it known that we, WILLIAM BARTHOLOMEW and FRITZ BALZER, citizens of the United States, and residents of Chicago, in the county of Cook and State of Illinois, have invented certain new and useful Improvements in Centrifugal-Extractor Mechanism, of which the following is a specification.

This invention relates to centrifugal extractors, and more particularly to bearing and oiling arrangements therefor.

The step bearings of gyratory machines and devices, for example, centrifugal extractors, have to be designed and built to stand not only the dead load imposed upon them, but also must be provided with flexible means to allow oscillation. The usual practice heretofore has been to provide the lower part of the spindle with a bushing which is provided with a flange. This flange rests between two rubber or rubber composition rings which are held in place in a casing, a suitable amount of pressure being exerted upon them by a lock nut. Rubber or rubber compositions, however, have the physical property such that under pressure they will not change their volume. Since it is necessary to produce a considerable degree of pressure to bring out the maximum amount of resiliency in the rubber rings, it is evident that the pressure so produced creates an increased pressure in the surrounding parts, such as the bushing or the casing. In any event the pressure created produces heat, and since extractor bearings do not receive an excessive amount of attention, the bearings are quickly spoiled by first the destruction of the rubber due to the heat generated by the pressure necessary to produce the proper amount of resiliency, and secondly by the failure of the bushing due to heat and consequent cutting. One of the objects, therefore, of the invention is to maintain the bearing portions in a cool condition and thereby preserve the parts in question.

Another object is to facilitate the proper lubrication of the bearing parts.

Another object is to provide a centrifugal extractor having novel spindle and bearing portions adapted to meet the various requirements for successful commercial operation.

These and other objects are accomplished by providing in a centrifugal extractor, the combination of a spindle, a bearing bushing therefor having curved coöperating surfaces whereby the spindle may gyrate in a guiding manner, and novel means whereby the parts may be lubricated.

The invention is illustrated on the accompanying sheet of drawings in which,

Figure 1 is a side elevation, parts being in section, of a centrifugal extractor embodying our invention;

Fig. 2 is an enlarged sectional view of the spindle and bearing mechanism taken in the plane of line 2—2 of Fig. 1;

Fig. 3 is a sectional view taken in the plane of line 3—3 of Fig. 1;

Fig. 4 is a sectional view taken in the plane of line 4—4 of Fig. 2, showing the grooved bearing step, and, Fig. 5 is an enlarged sectional view similar to the one shown in Fig. 2 and in addition showing additional supporting bearings.

The various novel features will be apparent from the following description and drawings, and will be particularly pointed out in the appended claims.

Our invention is illustrated in connection with a centrifugal extractor 10 having a perforated basket 11 mounted upon the upper end of a spindle 12, the lower end of which is located in a recessed portion 13 formed in the base portion 14 of the curb. The lower part of the spindle 12 is arranged to rotate in a bearing bushing 15 having near its upper end a laterally extending annular flange 16 semi-spherical in shape. This semi-spherical flange coöperates with a concave recessed portion 17 of a lock nut 18 screwed into the base of the curb. A coil spring 19 in the form of a frustated cone, the lower portion of which engages a shoulder 20 on the curb and the upper portion of which engages a washer 21, yieldingly holds the semi-spherical flange 16 into operative engagement with the curved portion 17 of the lock nut 18. By means of the arrangement thus far described it is apparent that any gyratory motion is guided by the coöperating curved surfaces of the semi-spherical flange 16 and lock nut 18. At the same time the spring 19 yieldingly holds the curved surfaces into engagement with each other and tends to maintain the spindle in a vertical position.

This spring also supports the spindle in a vertical direction.

The lock nut 18 has a central funnel shaped opening 21 for the reception of oil to lubricate the coöperating curved surfaces of the semi-spherical flange 16 and lock nut 18. The upper part of the bearing bushing 15 is provided with transversely arranged passageways 22 located within the funnel portion 21′ whereby oil may pass from the funnel through the passageways 22 to lubricate the engaging surfaces of the spindle 12 and bearing bushing 15. The bearing bushing is also provided with internally arranged longitudinally extending sets of grooves 23 and 24, the latter of which communicates with a spiral groove 25 formed in the upper surface of a step bearing 26 having a central opening 27 registering with a central opening 28 of the lower end portion of the bushing 15 whereby oil may drain into a space 29 formed in the base of the curb, which is closed by a removable plate 30. By means of this oiling arrangement it is apparent that all bearing surfaces may be maintained in good running condition. A cover 31 secured to the spindle 12 surrounds the bearing portions and forms a dust-proof covering.

In Fig. 5 we have shown substantially the same arrangement shown in Fig. 2, however, with the exception that additional bearings 32 are shown which are in the form of ball bearings. Step, ball or roller bearings may be provided at various points along the spindle if desired.

It is evident that there may be various modifications of the invention herein particularly shown and described, and it is our intention to cover all such modifications which do not involve a departure from the spirit and scope of the invention as set forth in the following claims.

We claim:

1. In a centrifugal extractor, the combination of a spindle, a bearing bushing therefor having a flange, and a member coöperating with said flange whereby the spindle may gyrate in a guided manner, said member having an oil containing receptacle for lubricating the coöperating surfaces, said bearing bushing being provided with a passageway in communication with the receptacle whereby the engaging surfaces of the spindle and bearing bushing may be lubricated.

2. In a centrifugal extractor, the combination of a spindle, a bearing bushing in which said spindle is rotatably mounted, a step bearing in the bottom of said bushing provided with a lubricating groove, said bushing having a flange, a member engaging said flange whereby the spindle may gyrate in a guided manner, said member having an oil containing receptacle, and means whereby oil from said oil retaining receptacle may be conveyed between the spindle and bushing to the groove in the step bearing for the spindle.

3. In a centrifugal extractor, the combination of a spindle, a bearing bushing therefor having a flange, a member coöperating therewith whereby the spindle may gyrate in a guided manner, means for lubricating the spindle and bearing bushing, a base in which the spindle and bearing bushing is mounted, and a removable cover for the base into which oil drained from the spindle and bushing may pass.

Signed at Chicago, Illinois, this 20th day of June, 1917.

WILLIAM BARTHOLOMEW.
FRITZ BALZAR.

Witnesses:
J. F. REUSTLE,
S. H. DEKKER.